United States Patent
Händel et al.

(10) Patent No.: US 7,366,118 B2
(45) Date of Patent: Apr. 29, 2008

(54) ECHO CANCELLATION

(75) Inventors: Peter Händel, Stockholm (SE); Jon Bergenheim, Uppsala (SE); Susanne Remle, Täby (SE)

(73) Assignees: Global IP Solutions Inc., San Francisco, CA (US); Global IP Solutions (GIPS) AB, Stockholm (SE)

( * ) Notice: Subject to any disclaimer, the term of this patent is extended or adjusted under 35 U.S.C. 154(b) by 400 days.

(21) Appl. No.: 10/512,569

(22) PCT Filed: Apr. 25, 2003

(86) PCT No.: PCT/SE03/00674

§ 371 (c)(1),
(2), (4) Date: Oct. 26, 2004

(87) PCT Pub. No.: WO03/092184

PCT Pub. Date: Nov. 6, 2003

(65) Prior Publication Data

US 2005/0220043 A1    Oct. 6, 2005

(30) Foreign Application Priority Data

Apr. 26, 2002 (SE) .................................. 0201259

(51) Int. Cl.
*H04B 3/20* (2006.01)
(52) U.S. Cl. .................. 370/286; 379/406.01
(58) Field of Classification Search .............. None
See application file for complete search history.

(56) References Cited

U.S. PATENT DOCUMENTS

| | | | |
|---|---|---|---|
| 4,582,963 A | 4/1986 | Danstrom | |
| 5,859,907 A | 1/1999 | Kawahara et al. | |
| 5,920,548 A | 7/1999 | El Malki | |
| 6,493,448 B1* | 12/2002 | Mann et al. | 379/406.01 |
| 7,039,182 B1* | 5/2006 | Leonidov et al. | 379/406.05 |
| 2002/0131583 A1* | 9/2002 | Lu | 379/406.08 |

FOREIGN PATENT DOCUMENTS

| | | |
|---|---|---|
| EP | 0 260 678 A1 | 3/1988 |
| EP | 0 597 201 A1 | 5/1994 |
| WO | WO-99/31866 A1 | 6/1999 |
| WO | WO 99/31866 A1 * | 6/1999 |
| WO | WO-01/45291 A1 | 6/2001 |

* cited by examiner

*Primary Examiner*—Ramnandan Singh
(74) *Attorney, Agent, or Firm*—Birch, Stewart, Kolasch & Birch, LLP

(57) ABSTRACT

The present invention relates to a cancellation of echoes in telecommunications systems, more specifically it relates to adaptive alignment of a linear filter (500) used for echo cancellation. According to the invention, it is continuously determined, by means of control logic (520), if a reflection replica delay included in an echo replica signal (110), which delay is provided by a signal buffer (510), should be attempted to be increased or not. Similarly, it is continuously determined if the reflection replica delay should be attempted to be decreased or not. In this way it is possible to provide a delay of the reflection replica which corresponds to the pure delay of a corresponding reflection included in an echo signal (120) received over an echo path. The invention is advantageous since the filter (500) will continuously and quickly adapt to changes in the echo path delay by continuously increasing or decreasing, in an incremental and smooth manner, a present replica delay.

30 Claims, 9 Drawing Sheets

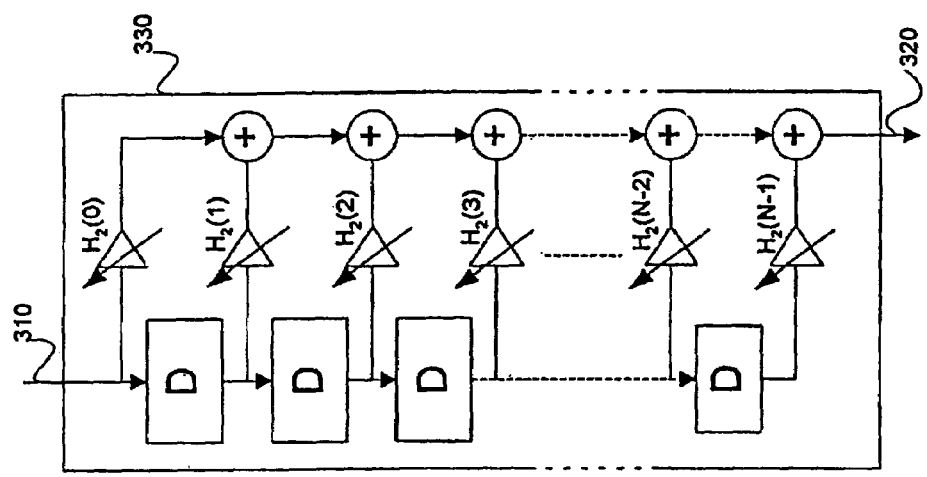
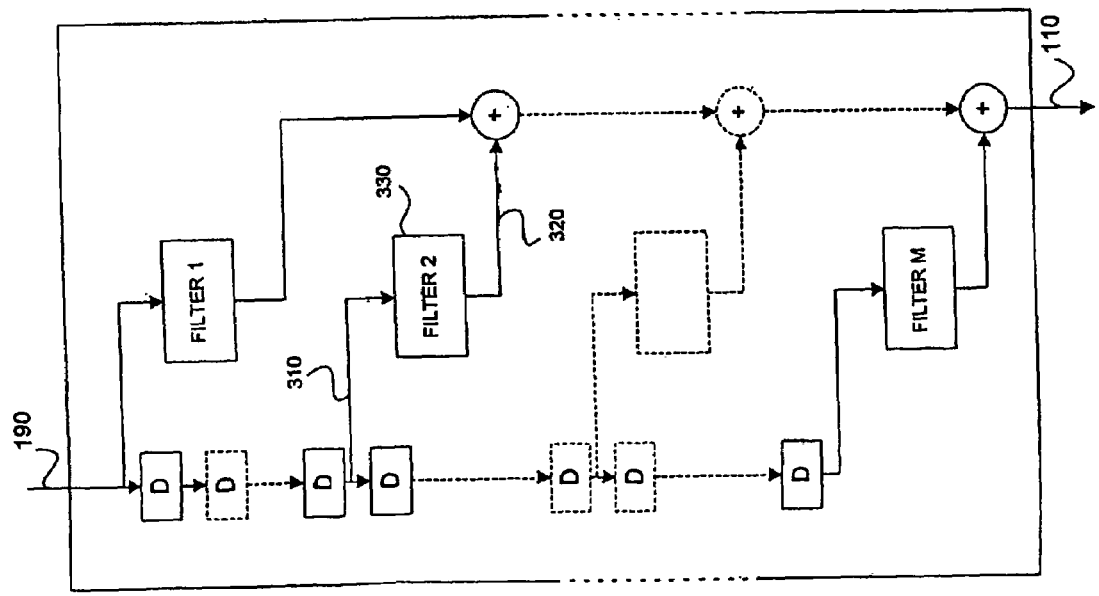
FIG. 13

ECHO CANCELLATION

TECHNICAL FIELD OF THE INVENTION

The present invention generally relates to cancellation of echoes in telecommunications systems, more specifically it relates to adaptive alignment of linear filters used for echo cancellation.

TECHNICAL BACKGROUND AND PRIOR ART

Speech quality is an important factor for telephony system suppliers. The demand from the customers makes it vital to strive for continuous improvements of the systems. An echo, which is a delayed version of what was originally transmitted, is regarded as a severe distraction to the speaker if the delay is long. For short round trip delays of less than approximately 20 ms, the speaker will not be able to distinguish the echo from the side tone in the handset. However, for long-distance communications, such as satellite communications, a remotely generated echo signal often has a substantial delay. Moreover, the speech and channel coding compulsory in digital radio communications systems and for telephony over the Internet protocol (IP telephony, for short) also result in significant delays which makes the echoes generated a relatively short distance away clearly audible to the speaker. Hence, canceling the echo is essential in order to maintain the speech quality.

There are different types of echoes that occur in a telephony system. One type is network echo that origins from impedance mismatch in hybrid circuits employed in the public switched telephony network (PSTN). Hybrids are used in order to connect between the two-wire link and four-wire link in the PSTN system. Since it is practically impossible to-perfectly tune the hybrids, the impedance mismatch will result in that some of the incoming speech is reflected back to the talker as a delayed and distorted version of the original speech. The reflected speech is denoted network echo. The occurrence of network echo is illustrated in FIGS. 1 and 2.

Another type of echo is echo originating from the use of hands free equipment with external loudspeaker(s) and microphone(s), so called acoustic echo. This type of echo has the property that the echo path changes continuously due to changes of the environment. The person talking on the phone may most likely change position as least to some extent during the call. The echo path is also highly non-linear, due to the characteristics of the room and the equipment, such as the loudspeakers. The occurrence of acoustic echo is illustrated in FIG. 3.

With the introduction of end-to-end IP telephony, the hybrids in the switches, introducing the network echo, disappear. It can be expected that it will take a considerable time until all telephones are replaced by IP telephones, if ever. Until then it will be necessary to have echo cancellers removing the network echo generated in the PSTN network. Furthermore, as long as digital radio communications networks are interconnected with PSTN networks, echoes generated in the PSTN network will have to be removed. Also, the acoustic echo will always remain, due to its physical connection.

An echo canceller typically includes a linear filtering part which essentially is an adaptive filter that tries to adapt to the echo path. In this way a replica of the echo can be produced that can be removed from the received signal originating from the end at which the echo source is located, thereby canceling the echo. The filter generating the echo replica has a finite or infinite impulse response. Most common it is an adaptive, linear finite impulse response filter (FIR) with a number of delay lines and a corresponding number of coefficients, or filter delay taps. The coefficients are values, which when multiplied with delayed versions of the filter input signal, generate an estimate of the echo. The filter is adapted, i.e. updated, so that the coefficients converge to optimum values. The traditional way to cancel out the echo is to update a finite impulse response (FIR) filter using the normalized least mean square (NLMS) algorithm, although a variety of alternative algorithms exist.

A problem arises from the fact that an entire echo path response includes one part due to signal propagation time, speech and channel coding etc., forming a pure delay, and one part due to the actual echo source. Thus, if the echo replica filter were to model the entire impulse response of the echo path, a great number of coefficients would be needed in order to also handle the included pure delay. This in turn would put very high, and often unrealistic, requirements on memory and computation capabilities for implementing the filter and its operation. Also, the coefficients of such a filter would converge much slower to their optimum values.

Thus, during echo cancellation it is desired that the echo canceller estimates the pure delay of the entire impulse response of the echo path in such way that the filter coefficients are adapted to the part of the entire echo that originates from the actual echo source. This procedure may be described as a time alignment of the filter to the echo source. In this way the number of coefficients of the filter can be kept to a reasonable and practicable level.

U.S. Pat. No. 4,582,963 discloses a method for echo canceling in which a bulk delay is provided separately from adaptive filter delays. Different methods for selecting a suitable bulk delay are described. One method is to detect how long it takes for an echo of a signal transmitted on the receive line of the echo source to occur on the transmit line of the echo source. A number of estimates of the bulk delay is provided and the selected bulk delay is given by the estimate which is most closely clustered with the other estimates. Another method is to iteratively increment the bulk delay, wherein each delay value is combined with the filter to give a measure of adaptation. The bulk delay is then chosen as the delay for which the measure of adaptation approaches a peak value.

U.S. Pat. No. 5,920,548 discloses the configuration of an adaptive filter in such way that only a range of filter taps between two tap endpoints is involved in the echo cancellation operation. All taps less than a first boundary tap serve as a buffer during the echo cancellation operation. The first boundary tap is selected as the tap being a certain number of taps less than a located tap that has a value with predetermined factor greater than a certain predetermined value.

SUMMARY OF THE INVENTION

An object of the present invention is to provide a method and an apparatus that continuously, with low numerical complexity, monitors the pure delay of a reflection included in an echo signal, and adapts the use of linear filter coefficients in accordance with this pure delay when canceling the echo.

According to the present invention, this and other objects are achieved by a method of an echo canceller according to claim 1, a computer-readable medium according to claim 18, an echo canceller according to claim 19, a system apparatus according to claim 30 and use of an echo canceller according to claim 31, which claims represent different aspects of the invention.

According to the invention, it is continuously determined if a reflection replica delay included in an echo replica signal, which delay is provided by a signal buffer, should be attempted to be increased or not, as well as being continuously determined if the reflection replica delay should be attempted to be decreased or not, in order to provide a delay of the reflection replica which corresponds to the pure delay of a corresponding reflection included in an echo-signal received over an echo path.

By continuously monitoring the echo reflection delay and determining if the replica delay should be increased or not, or decreased or not, and if so increasing or decreasing the present replica delay, the coefficients of the linear filter is used in an efficient way and the number of needed coefficients, and hence required memory, is reduced. Furthermore, with this operation the time of convergence for the filter and its coefficients will be reduced.

The echo path of an echo may vary during a telephone call, for example due to a call transfer. Also, the echo source itself may vary during a call. For example due to a change of phone device during the call, a third party connecting to the call, variations of the hybrid in the device used (e.g. affected by temperature) and so on. During acoustic echo the echo will be affected by movement of the device in a room and changes in the distance between a loudspeaker and a microphone of the device etc.

Also, if PC based terminals are used, the echo may also be affected by a clock drift in A/D and D/A devices primarily used by PC soundcards, or by telephony application delays in a PC environment if the application is not allocated enough processor time due to the higher priority given to other applications running in the same PC environment.

The invention is advantageous since the filter will continuously and quickly adapt to changes in the echo path, or changes of the echo caused by the echo source or its environment, by continuously increasing or decreasing, in an incremental and smooth manner, a present replica delay. This smooth delay adjustment, or re-alignment of the filter, also has the advantage that distortions of the generated echo replica due to re-alignments are minimized. Thus, the time of convergence of the filter coefficients during a re-alignment of the filter due to changes of the echo delay will be performed with extreme efficiency, while at the same time minimizing any distortions due to the re-alignment. Also, the invention performs the delay adjustments without having to monitor an excess number of filter coefficients, thus keeping the numerical complexity low.

Another advantage with the invention is that the continuously monitoring enables the echo cancellation process of the invention to better cope with echoes where the high energy levels are concentrated to several separated parts, thus forming several separated energy concentrations. These separated energy concentration may be the result of the characteristics of the echo source or of a distributed echo path in which the echo originates from multiple reflections. The invention enables the coefficients of the filter to cover the major part where the energy of the echo response is concentrated by adapting the buffer delay used for estimating the pure delay during echo cancellation in such way that the filter delay taps cover these parts in a more favorable way.

For example, with two separated energy concentration parts in the echo impulse response, the delay may be tuned in such way that the filter coefficients corresponding to long delays will cover a second part of the echo signal with high energy levels, while the filter taps providing short delays will cover as much energy as possible of a first part of the echo signal with high energy levels, thus leaving out the very beginning of the first part from the filter.

According to an embodiment of the invention, the echo cancellation is based on two or more linear filters, each filter generating a replica of a corresponding reflection energy concentration included in an echo based on a corresponding delayed input signal from a buffer. Thus, the different filters of the echo canceller are adapted to the different delays of different energy concentrations of a reflection. In this way the invention enables an even more improved cancellation of echoes that include two or more separated energy concentrations.

According to another embodiment, the basis for increasing the replica delay provided by the buffer is a relationship between the energy, measured as sum-squares of filter coefficients, of the beginning of the filter associated with short delays and the energy of the full length filter, i.e. the estimated echo return loss. If the energy measured in the beginning of the filter is low, the delay is increased. Correspondingly, if the energy measured for the coefficients of the tailing part of the filter is low in comparison with the energy of the full length filter, the delay is decreased. By measuring the beginning and tailing part, e.g. the first and the last quarter, respectively, of the filter coefficients, rather than for example the early half and late half, respectively, the alignment process of the invention achieves an improved resolution. Furthermore, the alignment process of the invention will, before re-alignment, know how much energy that will be lost if an increase/decrease operation excludes a beginning/tailing part of the coefficients from the echo replica. If this energy to be excluded is considered to be to high, the filter is simply not re-aligned. This also provides an improved way of controlling the re-alignment process, as compared to if this process were to be based on, for example, maximum correlation measurements between the echo replica and the true echo impulse response.

Yet another advantage is that the operation of the echo canceller in accordance with the invention does not require any searches for function maxima or correlation calculations during alignment and re-alignment of the filter coefficients.

BRIEF DESCRIPTION OF THE DRAWINGS

FIG. 13 shows an embodiment of the invention in which multiple short linear filters are employed.

DETAILED DESCRIPTION OF PREFERRED EMBODIMENTS

Figure 1:
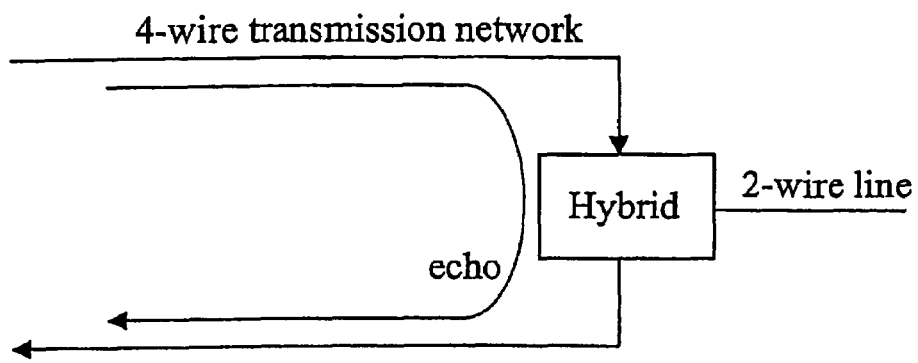
FIGS. 1 and 2 illustrate the occurrence of network echo.
Figure 2:
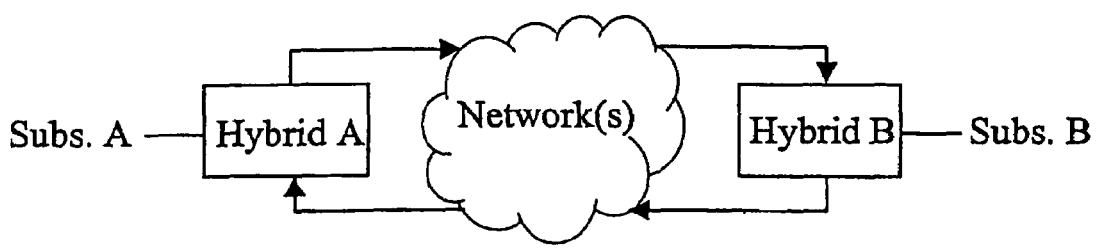
Figure 3:
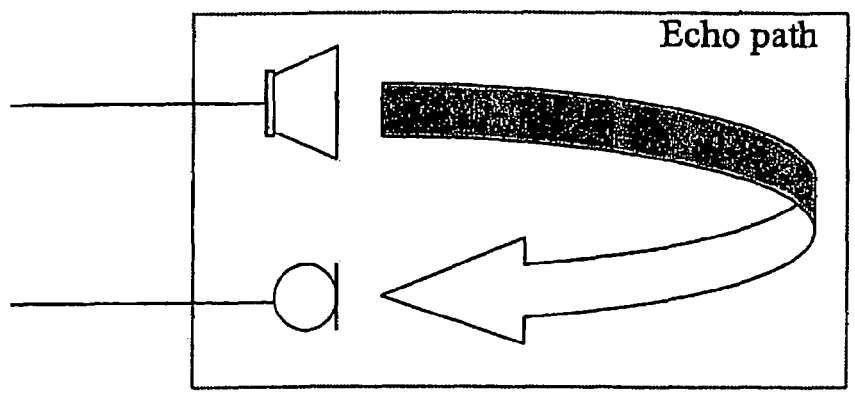
FIG. 3 illustrates the occurrence of acoustic echo.

FIGS. 1-3 exemplify different types of echoes which advantageously are cancelled by the present invention.

FIGS. 1 and 2 illustrates the occurrence of network echo. FIG. 1 shows the echo originating from a hybrid to which a subscriber by means of a 2-wire line is connected, i.e. the echo from the Public Switched Telephone Network (PSTN) line interface to which the subscriber is connected. FIG. 2 shows two PSTN phones interconnected via one or more networks, such as via satellite transmission paths, an IP network or a radio network. The signal from subscriber A is partly reflected at Hybrid B and returned to subscriber A as a network echo. Subscriber A would also receive a network echo if he were to be directly connected to a IP network or a radio network, such as a digital cellular communications network.

FIG. 3 shows the occurrence of acoustic echo due to cross talk between a loudspeaker and a microphone of a handset or a hands free equipment.

Figure 4:
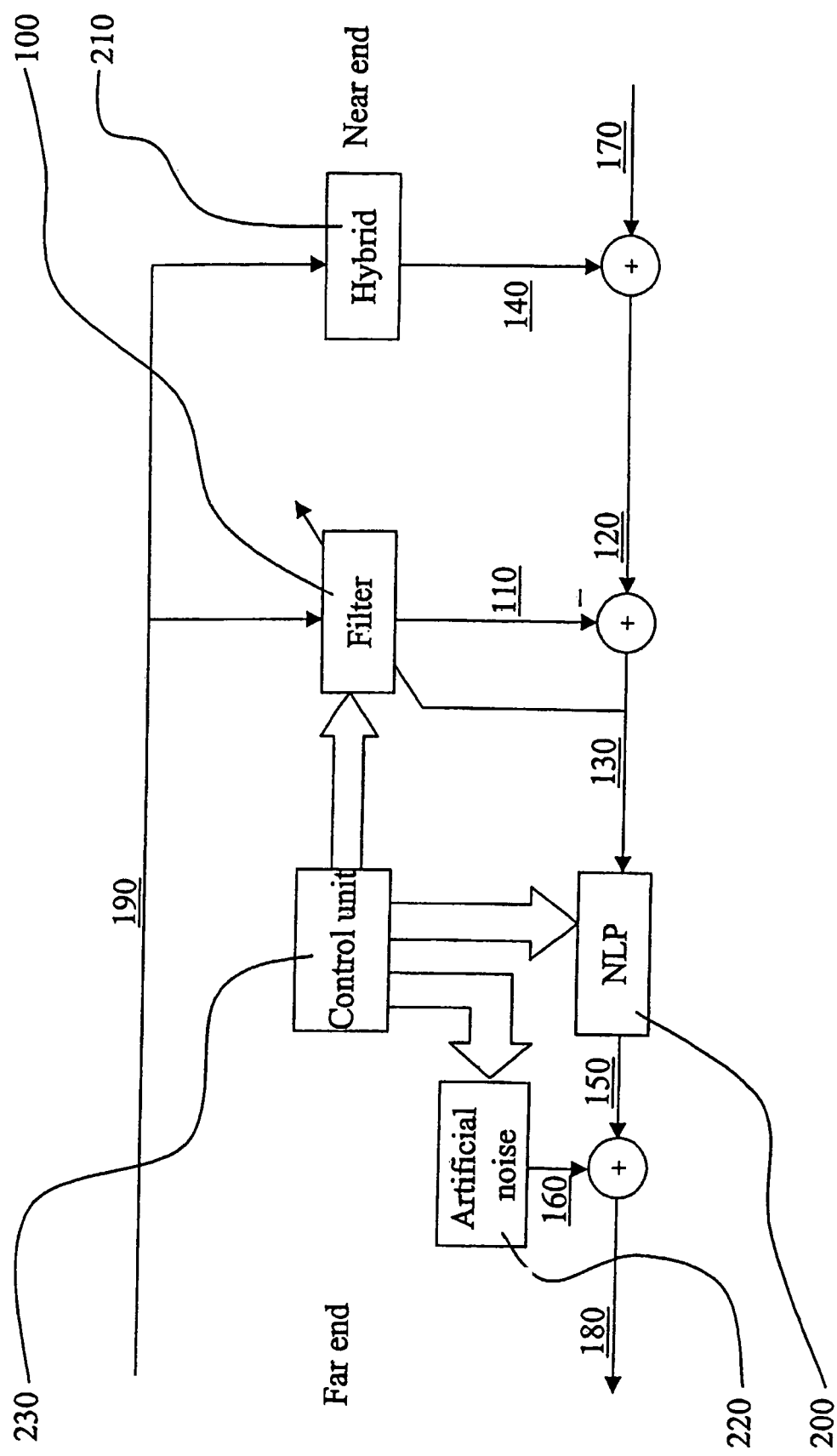
FIG. 4 shows a typical known echo canceller forming the basis for an exemplifying embodiment of the present invention.

FIG. 4 shows a typical known echo canceller which general structure and operation also form the basis for an exemplifying embodiment of the present invention.

With reference to FIG. 4, the echo canceller consists of a linear filtering part 100 and a non-linear part 200. A far end signal 190 generated at the far end and transmitted to the near end is input to the filtering part 100. The filtering part 100 is essentially an adaptive filter that tries to adapt to the echo path. In this way a replica 110 of the echo 140 can be produced, which can be removed from the returning signal 120. The echo canceller also includes a control unit 230, which supervises the update of the linear filter 100, the actions of the non-linear part 200 and an artificial noise generator 220.

The filtering part 100 is not able to describe the characteristics of the hybrid 210 perfectly, even when well converged. Thus, there will be some remaining echo after the filtering part included in the signal denoted 130. Even when the attenuation of the echo is high, for example 25 decibels, the echo will be audible to the far end speaker. In order to deal with this, the non-linear part 200, implemented as a non-linear processor (NLP), is designed to remove the remainder echo. Accordingly, the NLP should detect and remove the remaining echo in the signal 130 when the residual echo is audible. The residual echo is given by the difference between the echo 140 from the hybrid and the echo replica 110. Of course, the NLP shall not affect the near end signal 170, originating from a near end speaker, that has to be transmitted without distortion through the NLP 200. An NLP usually estimates correlation between different signals, and in this way decision is taken if there is any echo to remove.

In a simplified description the NLP may be a center clipper which simply cuts the low energy residual echo. Thus, after the remaining echo has been removed by the NLP, there will be sections of silence in the remaining signal 150. For this reason artificial noise 160, resembling the background noise of signal 170 from the near end, is constructed and inserted by an artificial noise generator 220 into the silent periods of signal 150. The resulting signal 180 is then, under the assumption that the injected noise 160 has the same characteristics as the real background noise of signal 170, supposed to sound well.

The control unit 230 supervises the actions of the filter update scheme, the NLP and the artificial noise injection. It hence has a significant impact of the overall performance of the echo canceller. Regardless of what underlying filter updating scheme that is chosen, the control logic decides when to permit update of the filter parameters in filter 100. The signals that are known to the control unit are, with reference to FIG. 4, the error signal 130, the estimated echo 110, the far end signal 190 and the near end returning signal 120 containing the echo signal 140 and the near end speech signal 170. From these measurements, the energy levels of the far end and the near end can be estimated. The noise level in the far end and the near end, respectively, are also needed. It is of great importance that the control unit is able to detect double talk, which is the occurrence of simultaneously speaker activity at both ends of the telephony connection.

Basically the functionality of the control logic is as follows. Adaptation of the linear filter 100 is allowed when all of the following conditions are fulfilled:

far end signal 190 has sufficient energy amount; and near end signal 170 is of low level.

Further, adaptation is prohibited when any of the following conditions are met:

far end signal 190 is of low level;

speech in near end signal 170 is of high level;

double talk is present, that is simultaneously speaker activity by both the far end and near end speaker; or background noise in near end signal 170 is of high level.

Figure 5:
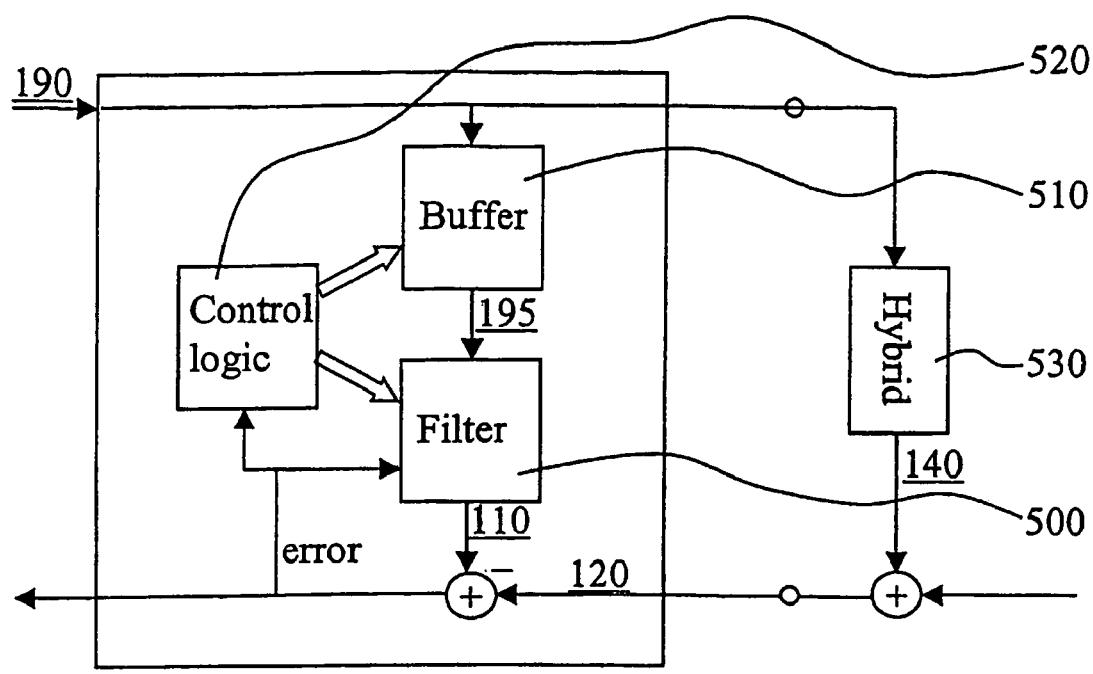
FIG. 5 shows a schematic view of an echo canceller in accordance with an embodiment of the invention.

With reference to FIG. 5 an schematic view of an echo canceller in accordance with an embodiment of the invention is shown. The echo canceller includes a linear filter 500, a buffer memory, or signal buffer 510 and control logic means 520. Any non-linear filtering part or artificial noise generator, or other elements usually present in an echo canceller, are not shown in FIG. 5, but may still be included. Depicted in the figure is also a hybrid 530 generating the echo which is to be cancelled.

The control logic means 520 is depicted in FIG. 5 as being connected to the buffer for the purpose of controlling the delay of a far end signal 190 conveyed by the buffer memory 510 to the input of the filter 500 as a delayed signal 195. The control logic means 520 includes first control logic circuitry and second control circuitry designed partly for determining if attempt should be made to increase the delay of the signal 195 conveyed to the filter 500, partly for controlling the actual operation of increasing the delay.

Correspondingly, the control logic means 520 also includes second control logic circuitry designed partly for determining if attempt should be made to decrease the delay of the signal 195 conveyed to the filter 500, partly for controlling the actual operation of decreasing the delay.

Preferably, the first and second control circuitry are designed to attempt to increase and decrease, respectively, the delay when the signal denoted "error" exceeds a respective predetermined threshold. As described above this error signals is indicative of a difference between a received echo signal 120 and the echo replica signal 110 produced by the filter 500. Alternatively, or in addition, the first and second control circuitry attempt to increase/decrease the delay at regular intervals defined by one or more included timers.

The first control circuitry includes circuitry means for calculating the sum-squares of a first set of filter coefficients associated with short delays, such as the beginning quarter of the coefficients, and relating this measure with the calculated sum-squares of a second set of coefficients representative of the full filter, typically corresponding to the echo return loss. If this relationship is below a first predetermined threshold the delay of the signal 195 input to the filter 500 is controlled to be incrementally increased.

Correspondingly, the second control circuitry includes circuitry means for calculating the sum-squares of a third set of filter coefficients associated with long delays, such as the tailing quarter of the coefficients, and relating this measure with the calculated echo return loss. If this relationship is below a second predetermined threshold the delay of the signal 195 input to the filter 500 is controlled to be incrementally decreased.

It should be understood that the described first and second control circuitry suitably are implemented by means of a digital signal processor (DSP) or some other suitable processing hardware means, such as a microprocessor or one or more application specific integrated circuits, which hardware is designed and configured for execution of program instructions so as to operate in accordance with the method of the present invention. Furthermore, the implementation of a linear filter and buffer memory for delaying a signal to the linear filter by means of appropriate memory circuits is well known to the person skilled in the art.

Figure 6:
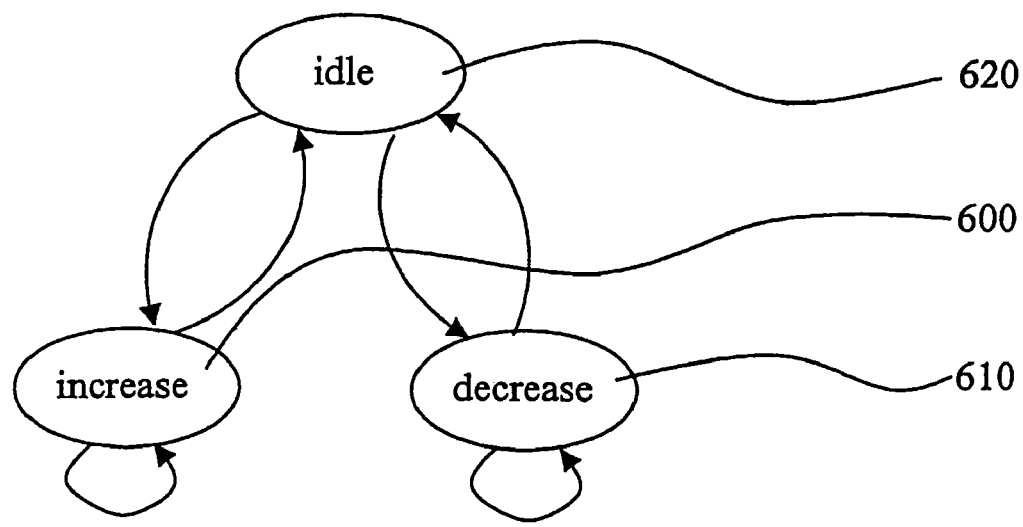
FIG. 6 shows a state diagram illustrating the overall operation of controlling a delay when canceling an echo in accordance with an embodiment of the invention.
Figure 10:
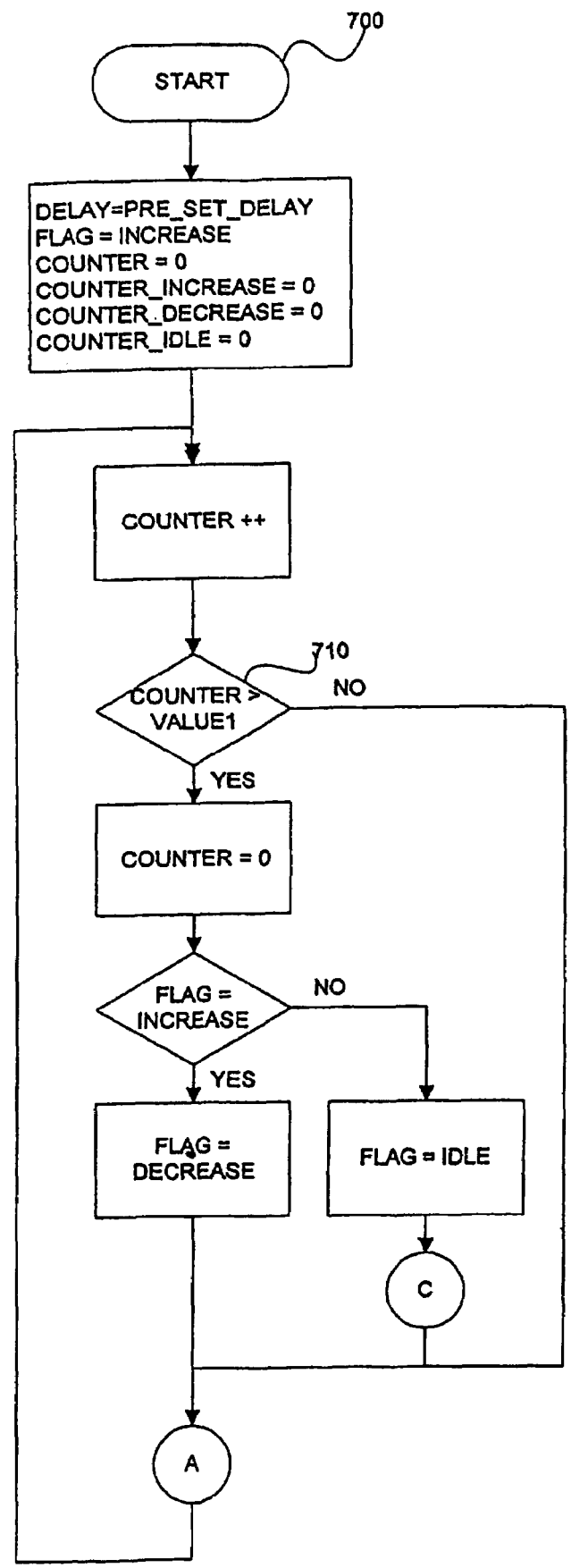
FIGS. 10, 11 and 12 illustrate an exemplifying decision logic realizing the state diagram shown in FIG. 6.
Figure 11:
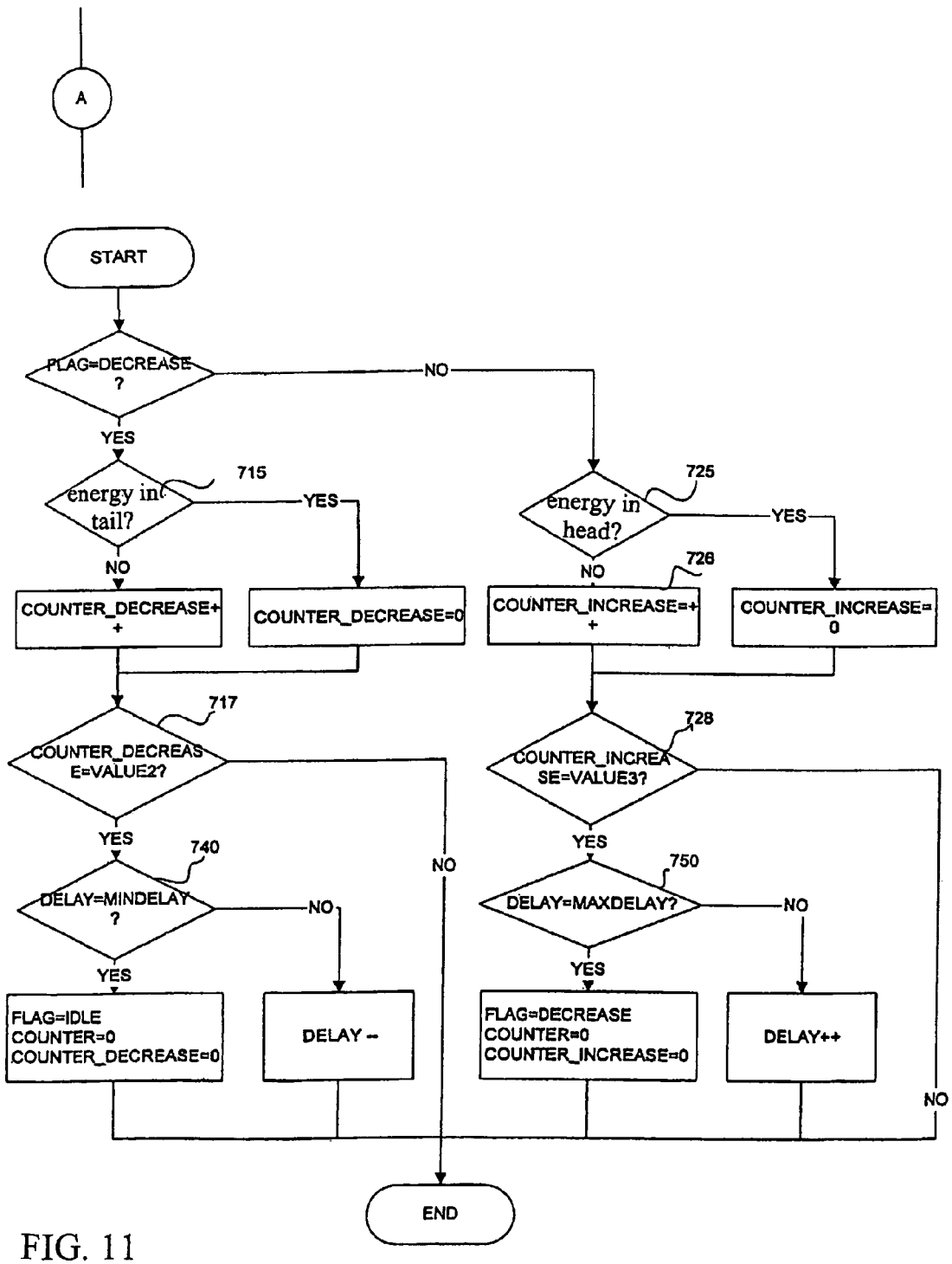
Figure 12:
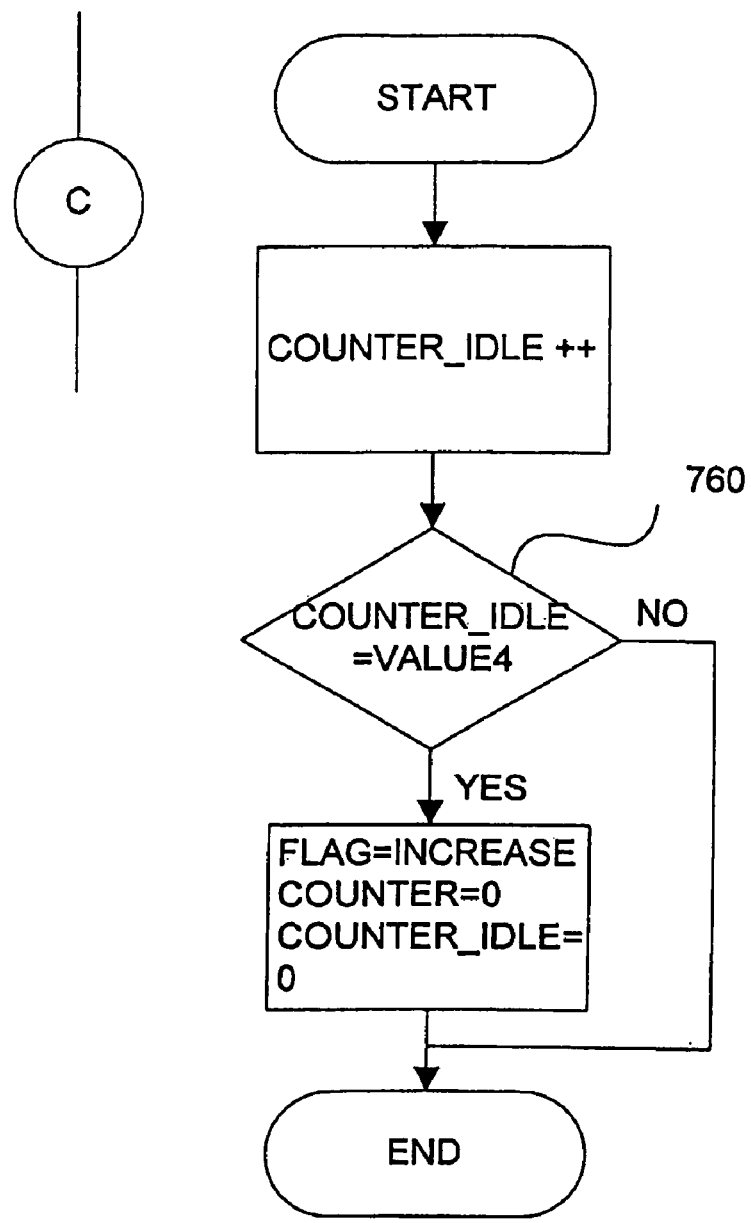

With additional reference to FIG. 6 a state diagram illustrates the overall operation of controlling the delay of the signal 195 provided to the input of the filter 500 by the signal buffer 510. The operation complies to a state diagram typically having three different states for controlling the positioning of the filter, an increase state 600, a decrease state 610 and an idle state 620, wherein each state indicates a corresponding mode of operation. The transitions between the different states are determined, in an exemplary embodiment, in accordance with the flow charts shown in FIG. 10, FIG. 11 and FIG. 12.

As long as the state machine is in the idle mode 620, there are no actions taken to adaptively align the filter. Transitions, or mode switches, from the idle mode 620 to the increase mode 600 and the decrease mode 610, respectively, are determined based on timers or if certain events are detected. A typical example of such events is any event that can be associated with a change of the echo path delay, such as a detected difference between a received echo signal 120 and the generated echo replica signal 110. If an echo path change is detected the state machine is reinitialized in accordance with the process shown in FIG. 10. The detection of an echo path change can be implemented as a test in the process of FIG. 10, a test which is incorporated prior to the counter value test 710. Initially it may be advantageous to force the state machine into increase mode in order to speed up the initial behavior of the echo canceller.

As long as the state machine is in increase mode 600, the control logic circuitry 520 of the invention tests if the delay of signal 195 can be increased relative to the far end signal 190. The delay of signal 195 relative to far end signal 190 is increased until a maximum pre-set delay determined by the size of the buffer 510 is reached (set by the scalar MAXDELAY in the test 750 in FIG. 11), or until energy is measured in the first set of coefficients in the adaptive filter 500 (test 725 in FIG. 11), or until a certain time period has expired (test 710 in FIG. 10). According to FIG. 6, the state machine then switches back to idle mode 620.

As long as the state machine is in decrease mode 610, the control logic circuitry 520 of the invention tests if the delay of signal 195 can be decreased relative to the far end signal 190. The delay of signal 195 relative to far end signal 190 is decreased until a minimum pre-set delay determined by the size of the buffer 510 is reached (set by the scalar MINDELAY in the test 740 in FIG. 11), or until energy is measured in the last set of coefficients in the adaptive filter 500 (test 715 in FIG. 11), or until a certain time period has expired (test 710 in FIG. 10). According to FIG. 6, the state machine then switches to idle mode 620.

Clearly, the scalar MINDELAY representing the minimum delay of signal 195 relative to the far end signal 190 is greater than or equal to zero. The scalar MAXDELAY is greater than MINDELAY, and typically corresponds to a delay of the order 64 to 256 ms.

To allow faster time tracking of the true delay it may be advantageous to let the thresholds of the timers be reduced if the magnitude or the power of residual error exceeds a certain threshold. For example, such test can be placed prior to test 760 in FIG. 12. If the test is positive, that is the magnitude of the residual error exceeds a certain threshold, then VALUE4 is reduced by half. After proper alignment of the filer, VALUE 4 is reset to its initial value. If this measure of the residual error exceeds a higher threshold it may be taken as a sudden change of echo path. The echo canceller is then re-initialized, i.e. the process again starts at step 700 in FIG. 10.

Referring again to FIG. 5, the echo canceller make use of a calculated measure of the echo return loss (ERL), which describes the attenuation of the echo due to the properties of the hybrid 530. For a far end signal 190 of level Px in decibels, the level of the echo 140, is roughly given by the difference Px−ERL [dB]. The sum-squared-filter taps, or coefficients, of the linear filter 500 produces an estimate of the ERL.

Figure 9:
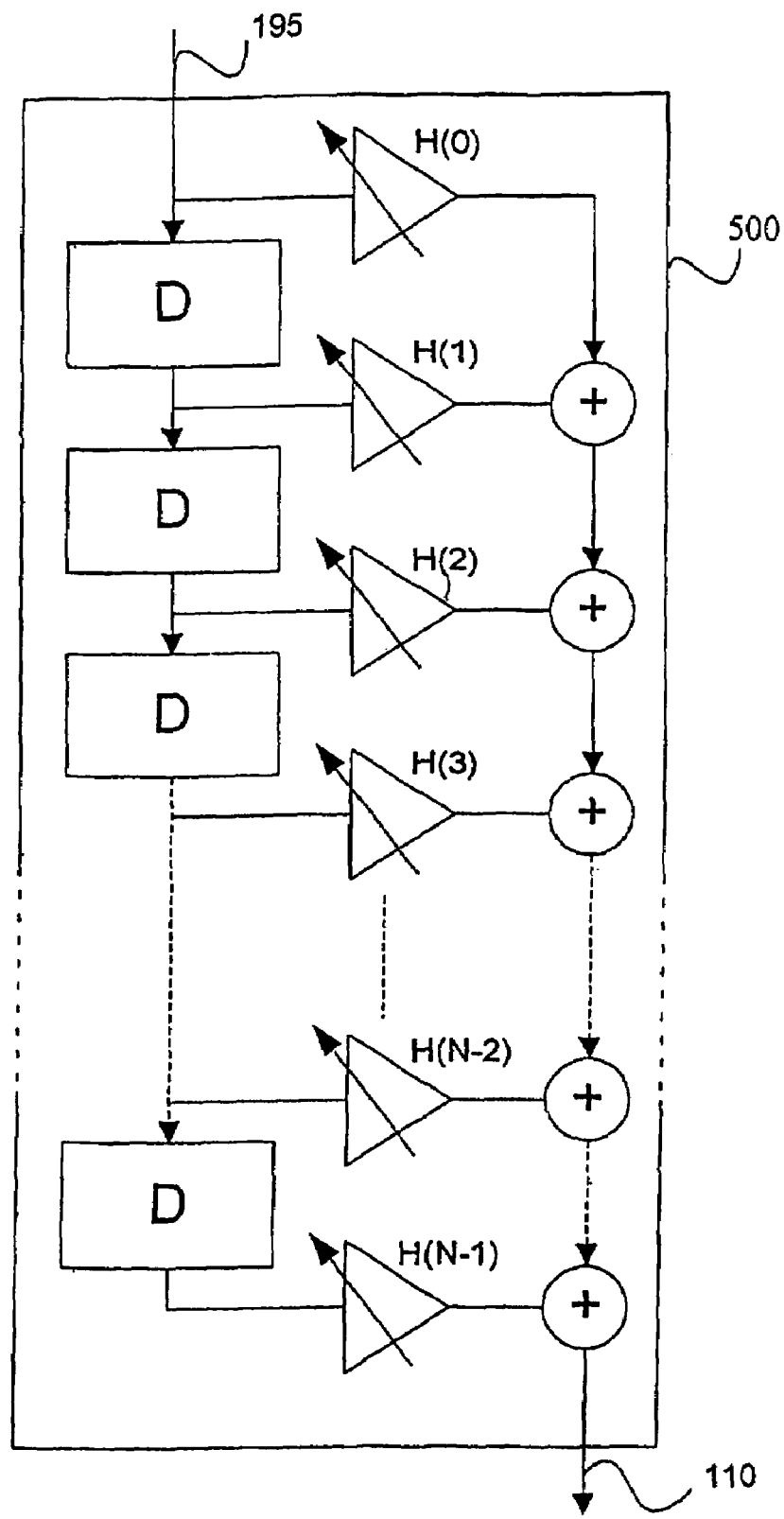
FIG. 9 shows a linear filter with finite impulse response which exemplifies the filter indicated in FIG. 5.

With reference to FIG. 9, the linear filter to which the delayed signal 195 is input is shown in more detail. The design of this filter per se is known to the skilled person. The estimate of the ERL is given by the sum of the squared filter weights h[0], h[1], . . . , i.e. the sum squares of the filter coefficients. By the linearity of the summation operator, the estimate of the ERL can be calculated as the sum of three terms, where:

The first term is the sum of a first set of squared filter taps. Below, this first term is denoted SUB_ERL_HEAD.

The second term is the sum of a set of squared filter taps in the middle of the filter.

The third term is the sum of a third set of squared filter taps. Below, this term is denoted SUB_ERL_TAIL.

With the first term being the sum-squared filter taps of the first part of the filter, it corresponds to the energy in the head of the filter, which part is associated with short delays. Accordingly, if the first term is close to zero, meaning that the first set of filter weights are all close to zero, it is reasonable to assume that the first part of the filter (the head) adapts to a pure delay. Thus, test 725 in FIG. 11 can be formalized according to

ERL>TRESHOLD1*SUB_ERL_HEAD

Where ERL is the estimated echo return loss, THRESHOLD1 is a predetermined threshold value and SUB_ERL_HEAD is the sum of a first set of squared filter coefficients.

Typically, the number of filter taps in the filter 500, depicted in FIG. 5 and FIG. 9, is in the range 256 to 1024 (32 to 128 ms at 8 kHz sampling rate), and SUB_ERL_HEAD is calculated based on 32 filter taps (4 ms at 8 kHz sampling rate). THRESHOLD1 is typically 128, meaning that the energy in the beginning of the filter is approximately 21 dB below the ERL. If the condition above is fulfilled there is no energy in the head of the filter and one is added the counter COUNTER_INCREASE (Action 726 in FIG. 11). If COUNTER_INCREASE has been updated VALUE3 times in sequence (test 728 in FIG. 11), the filter is adaptively aligned so that the bulk delay determined by the buffer 500 in FIG. 5 is increased by the same, or a smaller number, number of delays as used for calculation of SUB_ERL_HEAD under the control of the control logic 520. Clearly, there is an upper bound on the maximum allowable delay determined by test 750.

The filter alignment/re-alignment procedure described above will increase the delay provided by the buffer until a certain amount of energy is detected in the beginning of the filter with respect to the echo return loss. This amount is controlled by the predetermined threshold THRESHOLD1, or until a maximum preset delay determined by the scalar MAXDELAY. With reference to FIG. 5, the procedure strives to maximize the delay in the buffer 510.

For one skilled in the art it is evident that a similar approach can be used in order to decrease the delay for proper re-alignment of the filter, i.e. by comparing the relationship between the sum-squared taps of the tailing part of the filter and the ERL with a second predetermined threshold (THRESHOLD2). In a preferred embodiment, this is described by tests 715, 717 and 740 in FIG. 11.

Re-alignment of the filter is performed smoothly by delay shifts of coefficients in the filter 500. With the vector h indicating the impulse response produced by the filter, that is $$h=[h(0), \ldots, h(N-1)]$$

then, a smooth transition for increasing the delay is performed with the following two steps
a) downshifting of the impulse response, that is h[1]:=h[1+VALUE], where VALUE is the introduced delay. This operation is performed for all integers 1 such that 1=0, ..., N-VALUE-1.
b) resetting the N-VALUE last values to zero, that is h[1]:=0.0 for 1=N-VALUE, ..., N-1.

For the opposite operation, that is in order to decrease the buffer delay, the two steps of the following scheme are preferred:
a) shifting of the impulse response, that is h[1]:=h[1-VALUE], where VALUE is the value of the reduction of the delay. This operation is performed for all integers 1 such that 1=N-1, ..., N-VALUE. Note here that h[1] is updated for decreasing values of 1.
b) resetting the N-VALUE first coefficients to zero, that is h[1]:=0.0 for 1=0, ..., N-VALUE-1.

Figure 7:
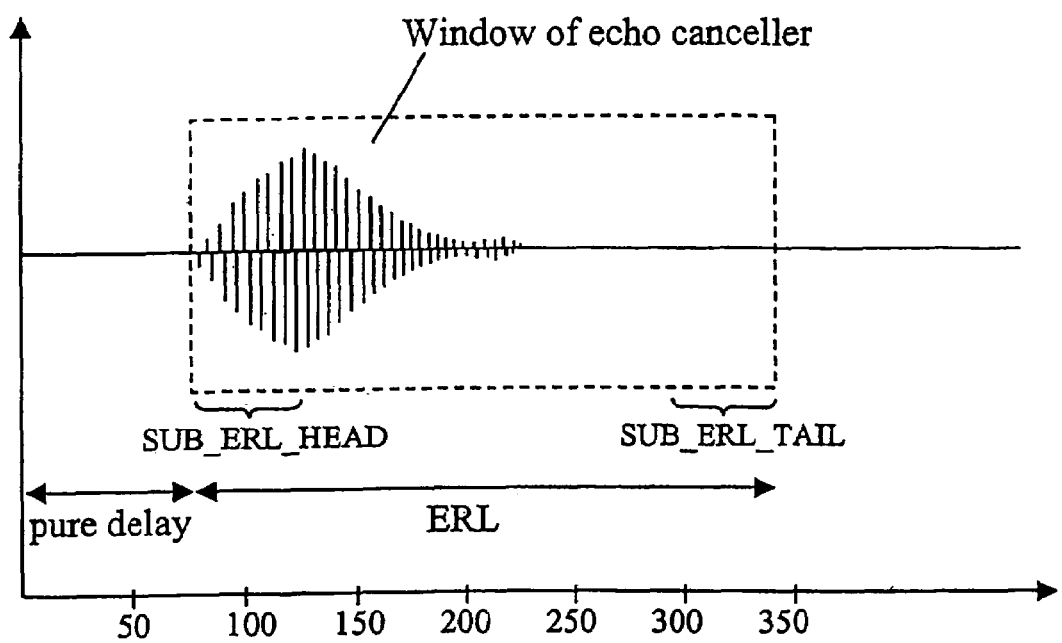
FIGS. 7 and 8 illustrate exemplifying positionings of a linear filter and its coefficients after having been aligned to an echo impulse response in accordance with the invention.
Figure 8:
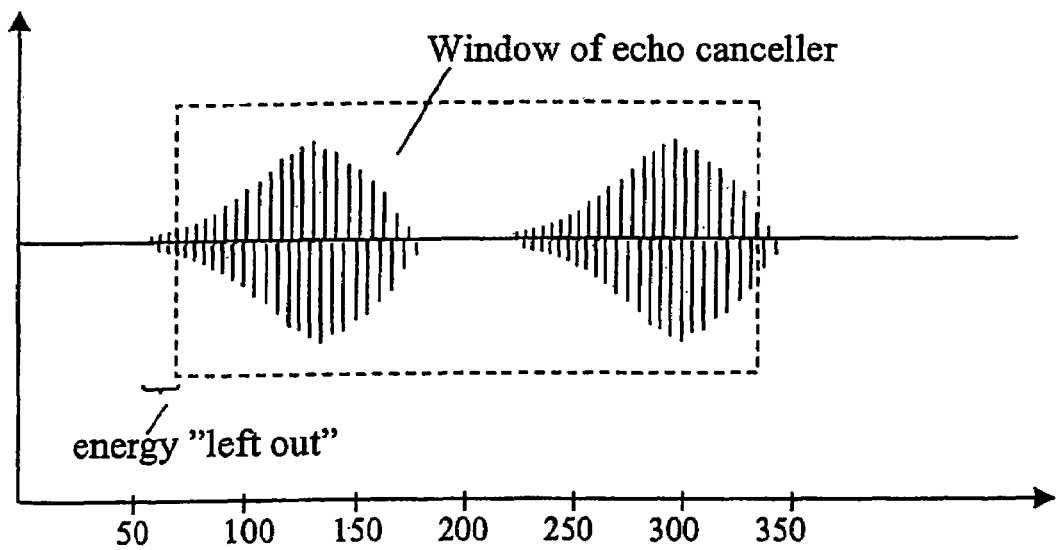

With reference to FIGS. 7 and 8, exemplifying positionings of the filter coefficients, depicted as a "window of the echo canceller" are illustrated after having been aligned to an echo impulse response in accordance with the invention. In these examples, as indicated in the figures, the filter has 256 coefficients. Thus making the number of coefficients explicitly indicated in the figures merely illustrative.

In FIG. 7 it can be seen that no filter coefficients are associated the pure echo path delay, i.e. the window of the echo canceller does not cover this pure delay, but the pure delay is estimated by the buffer 510 in accordance with the scheme of the invention. Indicated in FIG. 7 is also a set of coefficients in the beginning of the filter, depicted as SUB_ERL_HEAD, and a set of coefficients at the tailing part of the filter, depicted as SUB3_ERL_TAIL. It is the sum-squares of these SUB_ERL_HEAD and SUB_ERL_TAIL parts that during the alignment have been related to the coefficients representative of the full filter, i.e. the echo return loss indicated in FIG. 7 as ERL.

In FIG. 8 it can be seen that the filter has been aligned so as to cover an echo impulse response that includes two separated energy concentrations. It should be noted that in accordance with the scheme of the invention, the delay has been increased so as to fully cover the second energy concentration, while leaving out the very beginning of the echo impulse response since this part has very low energy levels. It should be understood that this example is tailored to clarify the invention, and the example is of course dependent upon the positioning of the energy concentration in relation to the full length of the filter used.

One skilled in the art may readily appreciate that the scheme of the present invention may be employed also for, so called, two path models or double filter structures where two filters are employed. In such a set-up a foreground and a background filter, using different control logic arrangements, models the echo path, thereby making the echo canceller more robust to double talk. The use of such double filter structures is known to the person skilled in the art.

The complexity of an echo canceller is often directly proportional to the number of active coefficients of the adaptive filter. The required length (number of coefficients) of the filter depends on the hybrid (hybrids) or room acoustics in the echo path. Preferably, the echo canceller should allow for multiple reflections, in which case one pure delay estimation most often will not be enough since it often will not be possible to select one pure delay that covers all reflections.

A solution that is attractive in terms of complexity is to use multiple short filters instead of a longer one. The delay estimation method outlined in this application is very useful in such scenarios. For example, a filter of length 256 may fail to provide a good results, but 2 filters of length 64 may provide a very good result. Thus, similarly to aligning one filter to handle one pure delay, multiple filters are separately aligned to handle distributed echo paths where the echo originates from respective multiple reflection. Such a structure is exemplified in FIG. 13., wherein the far end signal 190 is input to the multiple filters denoted FILTER 1. M and the signal 110 is the generated echo replica signal. As apparent from the reference signs, FILTER 2 330 is also included in the drawing at a greater level of detail in order to exemplify the filters included by the multiple filter structure. In this respect, the echo path can be modeled by a first part containing a delay and a reflection, a second part containing another delay and reflection, and so on. Once the first bulk delay and echo path have been identified and the filter accordingly has been aligned, the sequential alignment can be achieved in a similar vein.

Thus, it is evident that method outlined above can be used to control and align multiple filters as well a single filter. Another example of a way to align such filters would be to start with one filter of a maximum length, as limited by computational power. Then, the delay is increased until a maximum delay is found. The filter is then divided into two separate filters, each one using a separate delay estimate and alignment. Typically, the filter is divided in half. If the proposed method is used to align also a second filter the estimated associated second delay will be increased until the second reflection is found. It is necessary to add a condition to prevent overlap of the filters.

Thus, the invention is not only able to handle a static pure delay by buffering data, it can adaptively increase as well as decrease the buffer size as well as handle an echo path with separated energy concentrations and distribute the filter coefficients to cancel a distributed echo.

Even though the invention has been described with reference to specific exemplifying embodiments thereof, many different alterations, modifications and the like will become apparent for those skilled in the art. The described embodiments are therefore not intended to limit the scope of the invention, as it is defined by the appended claims.

The invention claimed is:

1. A method of an echo canceller, which echo canceller includes a linear filter for generating an echo replica signal from filter coefficients of delay taps and an input signal to the filter, the method including the steps of:
   a) applying a signal transmitted in the direction of an echo source as input signal to a signal buffer, the signal buffer providing a delayed input signal to the input of the filter, which delayed signal has a delay that is subject to control by control logic included by the echo canceller, characterized by repeatedly performing the steps of:
   b) determining, based on a predetermined first mode switch condition, whether or not it should be attempted to increase the delay of the input signal to the filter, and if the first mode switch condition is met, entering an increase mode in which, if a ratio between a calculated measure based on a first set of filter coefficients and a calculated measure based on a second set of filter coefficients is below a first predetermined threshold, the buffer is controlled to increase the delay of the input signal; and
   c) determining, based on a predetermined second mode switch condition, whether or not it should be attempted to decrease the delay of the input signal to the filter, and if the second mode switch condition is met, entering a decrease mode in which, if a ratio between a calculated measure based on a third set of filter coefficients and the calculated measure based on the second set of filter coefficients is below a second predetermined threshold, the buffer is controlled to decrease the delay of the input signal.

2. The method as claimed in claim 1, wherein the echo canceller includes a second linear filter for generating a replica of a second energy concentration of a reflection from the echo source, which replica of the second reflection is included in the echo replica signal, said signal buffer providing a second delayed input signal to the input of the second filter, which second delayed input signal has a second delay which is controlled by means of said control logic in accordance with step b) and c), thereby generating an echo replica signal including two separated energy concentrations of a reflection.

3. The method as claimed in claim 2, wherein one or more additional linear filters are included in the echo canceller for generating, based on one or more corresponding additional delayed input signals from the signal buffer having delays which are controlled in accordance with step b) and c), an echo replica signal including one or more corresponding additional energy concentrations of a reflection.

4. The method as claimed in claim 1, including basing said first and said second mode switch conditions on events which are associated with a change of the echo path.

5. The method as claimed in claim 1, including defining said first and said second mode switch conditions to be met when a difference between a received echo signal and the echo replica signal produced by the filter exceeds a first error threshold.

6. The method as claimed in claim 1, including defining said first and said second mode switch conditions to be met at certain intervals under the control of one or more timers.

7. The method as claimed in claim 1, wherein said first set of filter coefficients includes coefficients associated with short delays;

said third set of filter coefficients includes coefficients associated with long delays; and
said second set of filter coefficients is representative of the full length of the filter.

8. The method as claimed in claim 1, wherein the calculated measures are energies in the form of sum-squares of the respective sets of filter coefficients.

9. The method as claimed in claim 1, wherein said linear filter is a finite impulse response (FIR) filter.

10. The method as claimed in claim 1, wherein the method is performed in an end-user equipment for telephony in order to cancel acoustic echo produced by cross-talks between a loudspeaker and a microphone or by reflections of the surroundings in which the end-user equipment is located.

11. The method as claimed in claim 1, wherein the method is performed in a local telephony switch operatively connected to an end-user equipment for telephony.

12. The method as claimed in claim 1, wherein the method is performed in a telephone switch operatively connected to a local telephony switch.

13. The method as claimed in claim 1, wherein the method is performed in a long distance telephone switch operatively connected to a local telephony network, or in a gateway employed by such an operative connection.

14. The method as claimed in claim 1, wherein the method is performed in a mobile communications network, such as in a Mobile Switching Centre, operatively connected to a telephony network, or in a gateway employed by such an operative connection.

15. The method as claimed in claim 1, wherein the method is performed in an packet switched network operatively connected to a telephony network, or in a gateway employed by such an operative connection.

16. The method as claimed in claim 15, wherein said packet switched network is an Internet Protocol network.

17. A computer-readable medium storing computer-executable components for causing an echo canceller, which echo canceller includes at least one linear filter for generating an echo replica signal and a delay buffer for conveying a signal transmitted to an echo source as delayed input signals to each of said at least one linear filter, to perform the steps recited in of claim 1 when the computer-executable components are run on general purpose computer included by the echo canceller.

18. An echo canceller including a linear filter for generating an echo replica signal from filter coefficients of delay taps and an input signal to the filter, the echo canceller further including:
   a buffer memory interconnecting a transmission line for transmitting a signal in the direction of an echo source and an input of the filter; and
   control logic means connected to the buffer memory for controlling the delay of the signal conveyed by the buffer memory to the input of the filter, characterized in that the control logic means includes:
   first control circuitry for repeatedly determining, based on a predetermined first mode switch condition, whether or not it should be attempted to increase the delay of the input signal to the filter, and if the first mode switch condition is met, entering an increase mode in which, if a ratio between a calculated measure based on a first set of filter coefficients and a calculated measure based on a second set of filter coefficients is below a first predetermined threshold, the buffer is controlled to increase the delay of the input signal; and
   second control circuitry for repeatedly determining, based on a predetermined second mode switch condition, whether or not it should be attempted to decrease the delay of the input signal to the filter, and if the second mode switch condition is met, entering a decrease mode in which, if a ratio between a calculated measure based on a third set of filter coefficients and the calculated measure based on the second set of filter coefficients is below a second predetermined threshold, the buffer is controlled to decrease the delay of the input signal.

19. The echo canceller as claimed in claim 18, including a second linear filter for generating a replica of a second energy concentration of a reflection from the echo source, which replica of the second reflection is included in the echo replica signal, said buffer memory being arranged to convey a second delayed input signal to the input of the second filter, which second delayed input signal has a second delay which is controlled by means of said first and said second control circuitry, thereby providing an echo replica signal including two separated energy concentrations of a reflection.

20. The echo canceller as claimed in claim 19, including one or more additional linear filters for generating, based on one or more corresponding additional delayed input signals from the buffer memory having delays which are controlled by means of said first and said second control circuitry, an echo replica signal including one or more corresponding additional energy concentrations of a reflection.

21. The echo canceller as claimed in claim 18, wherein said first and second control circuitry are arranged to base said first and said second mode switch conditions on events which are associated with a change of the echo path.

22. The echo canceller as claimed in claim 18, wherein said first and second control circuitry are arranged to determine that said first and said second mode switch conditions are met when a difference between a received echo signal and the echo replica signal produced by the filter exceeds a first error threshold.

23. The echo canceller as claimed in claim 18, including one or more timers for controlling intervals, the intervals defining when said first and said second mode switch conditions are met.

24. The echo canceller as claimed in claim 18, wherein said first set of filter coefficients includes coefficients associated with short delays;

said third set of filter coefficients includes coefficients associated with long delays; and said second set of filter coefficients is representative of the full length of the filter.

25. The echo canceller as claimed in claim 18, wherein the calculated measures are energies in the form of sum-squares of the respective sets of filter coefficients.

26. The echo canceller as claimed in claim 18, wherein said linear filter is a finite impulse response (FIR) filter.

27. The echo canceller as claimed in claim 18, wherein the control logic means with its first and second control circuitry are implemented by means of a digital signal processor, a general purpose microprocessor or one or more application specific integrated circuits.

28. A system including of any one of the following equipments:
   an end-user equipment for telephony over a circuit switched or a packet switched network;
   a local telephony switch operatively connected to an end-user equipment for telephony;
   a telephone switch operatively connected to a local telephony switch;
   a Mobile Switching Centre of a mobile communications network operatively connected to a telephony network; or
   a gateway interconnecting either a packet switched network or a mobile communications network with telephony network,
   and further including, as part of the equipment or connected to the equipment, an echo canceller in accordance with claim 18.

29. A method for canceling acoustic echo produced by cross-talks between a loudspeaker and a microphone of an end-user equipment for telephony, or produced by reflections of the surroundings in which the end-user equipment is located, comprising the step of canceling the echo by means of an echo canceller as claimed in claim 18.

30. A method for canceling an echo signal produced by circuitry in a local telephony switch, comprising the step of canceling the echo signal by means of an echo canceller as claimed in claim 18.

* * * * *